(12) United States Patent
Kim et al.

(10) Patent No.: US 9,496,716 B2
(45) Date of Patent: Nov. 15, 2016

(54) ISLANDING DETECTION APPARATUS FOR PARALLEL DISTRIBUTED GENERATION SYSTEM

(71) Applicant: KACO new energy Inc., Gyeonggi-do (KR)

(72) Inventors: Kwang Seob Kim, Gyeonggi-do (KR); Trung Kien Vu, Gyeonggi-do (KR); San Kang, Gyeonggi-do (KR); Min Jae Kim, Gyeonggi-do (KR); Jae Yeon Choi, Gyeonggi-do (KR)

(73) Assignee: KACO NEW ENERGY INC., Seongnam-si, Gyeonggi-do (KR)

( * ) Notice: Subject to any disclaimer, the term of this patent is extended or adjusted under 35 U.S.C. 154(b) by 95 days.

(21) Appl. No.: 14/688,430

(22) Filed: Apr. 16, 2015

(65) Prior Publication Data

US 2016/0084891 A1 Mar. 24, 2016

(30) Foreign Application Priority Data

Sep. 18, 2014 (KR) .......................... 10-2014-0124072

(51) Int. Cl.
*G01R 19/25* (2006.01)
*H02J 3/38* (2006.01)

(52) U.S. Cl.
CPC ............ *H02J 3/38* (2013.01); *H02J 2003/388* (2013.01)

(58) Field of Classification Search
CPC ............................ H02J 3/38; H02J 2003/388
See application file for complete search history.

(56) References Cited

U.S. PATENT DOCUMENTS

2013/0058139 A1* 3/2013 Bae .......................... H02H 3/38
363/55

FOREIGN PATENT DOCUMENTS

| JP | 09-046909 A | 2/1997 |
|---|---|---|
| JP | 2012-085384 A | 4/2012 |
| KR | 10-2007-0056264 A | 6/2007 |
| KR | 10-2013-0026092 A | 3/2013 |
| KR | 10-2013-0112739 A | 10/2013 |
| KR | 10-2013-0124881 A | 11/2013 |

\* cited by examiner

*Primary Examiner* — David Gray
*Assistant Examiner* — Michael Harrison
(74) *Attorney, Agent, or Firm* — Rabin & Berdo, P.C.

(57) ABSTRACT

An islanding detection apparatus minimizes a reduction in power quality and detects islanding when distributed generations are operated in parallel. Also, another islanding detection apparatus for parallel distributed generations synchronizes parallel distributed generations by periodically applying a reactive current at a half cycle. Further, another islanding detection apparatus for parallel distributed generations easily synchronizes parallel distributed generations even when inverters installed in the respective distributed generations are fabricated through different makers.

7 Claims, 4 Drawing Sheets

ISLANDING DETECTION APPARATUS FOR PARALLEL DISTRIBUTED GENERATION SYSTEM

BACKGROUND

1. Technical Field

The present disclosure relates to an apparatus for detecting islanding when power supply from a grid power source (commercial power source) is cut off.

2. Related Art

Recently, the development of a distributed generation system using solar cells or fuel cells which have a small influence on the environment has been actively conducted in terms of global environment protection. Such a distributed generation system converts DC power generated by the solar cells or the like into AC power with a commercial frequency through an inverter, and supplies the AC power to a system load in connection with a grid power source, while transmitting surplus power to the grid power source.

The distributed generation system must prevent reverse charge from the distributed generations to the grid power source when the power supply of the grid power source is stopped. Thus, when the power supply of the grid power source is stopped, the distributed generation system detects islanding of the distributed generations, isolates the distributed generations from the grid power source, and stops operation of the inverter.

The method for detecting islanding may include a passive method which detects a rapid change in a voltage waveform or phase when islanding is performed. However, when the balance between output power of the inverter and power consumption of the load is maintained, the passive method cannot detect islanding because no change occurs in the grid when the islanding is performed.

Furthermore, the method for detecting islanding may include an active method which slightly changes an output voltage or frequency of the inverter and detects that the change becomes prominent when islanding is performed.

In the active method, however, when a plurality of distributed power systems are connected in parallel to the grid, the change may be offset to degrade the islanding detection function.

Technology for solving such a problem has been disclosed in Japanese Patent Laid-open Publication No. 2012-085384.

The technology disclosed in the above-described patent relates to a method for detecting islanding of a distributed generation system which changes DC power of distributed generations into AC power through an inverter and supplies the AC power to a load in connection to a commercial power source of a power grid line. The method controls the inverter to overlap an output current of the inverter at a connection point with the commercial power source with a secondary harmonic current synchronized with a fundamental wave of the output current, and detects islanding based on an even harmonic wave of the fundamental wave included in the grid voltage at the connection point.

According to the method, since the output current of the inverter at the connection point, which is controlled in phase with the grid voltage, overlaps the secondary harmonic current synchronized with the fundamental wave of the output current, the harmonic current overlapped with the output current of the inverter in each of the distributed power systems may be synchronized with the phase of the grid voltage, when the distributed power systems are operated in a state where they are connected in parallel to the grid. Then, since the harmonic currents of the respective distributed power systems do not offset each other, the degradation of the islanding detection function may be prevented.

In the above-described technology, however, since both the upper and lower half cycles of the secondary harmonic wave are overlapped, the power quality is degraded.

Furthermore, while one distributed generation is installed and operated, another distributed generation might need to be additionally installed. In this case, as one of islanding detection methods, the injection directions of reactive power in the plurality of distributed generations may be synchronized through communication. However, when the inverters of the respective distributed generations are manufactured by different makers, the inverters are highly likely to have different control circuits or methods. Thus, the installation of communication lines may become difficult or complex.

PRIOR ART DOCUMENT

Patent Document

Japanese Patent Laid-open Publication No. 1997-046909
Japanese Patent Laid-open Publication No. 2012-085384

SUMMARY

Various embodiments are directed to an islanding detection apparatus capable of minimizing a reduction in power quality and detecting islanding when distributed generations are operated in parallel.

Also, various embodiments are directed to an islanding detection apparatus for parallel distributed generations, which is capable of synchronizing parallel distributed generations by periodically applying a reactive current at a half cycle.

Also, various embodiments are directed to an islanding detection apparatus for parallel distributed generations, which is capable of easily synchronizing parallel distributed generations even when inverters installed in the respective distributed generations are fabricated through different makers.

In an embodiment, an islanding detection apparatus for parallel distributed generations may include: an inverter configured to convert a DC voltage supplied from a renewable energy source into an AC voltage; a three-phase/two-phase converter configured to convert an output of the inverter into a three-phase/two-phase stationary reference frame; a phase locked loop (PLL) configured to calculate the phase and frequency of a grid voltage of a grid connected to the inverter using a two-phase voltage outputted from the three-phase/two-phase converter; a filter configured to pass a half cycle of one cycle of a signal outputted from the three-phase/two-phase converter or the PLL; a phase controller configured to generate a current phase reference value for controlling an output phase of the inverter, using the frequency of the output voltage of the PLL and a current amplitude reference value applied from outside; a half cycle passer configured to perform an AND operation on the current phase reference value outputted from the phase controller and an output of the filter and output a current phase reference value for islanding detection; a current reference frame converter configured to convert the current amplitude reference value of a synchronous reference frame and the current phase reference value of the synchronous reference frame, outputted from the half cycle passer, into a current amplitude reference value and a current phase reference value of a two-phase stationary reference frame, using a phase angle outputted from the PLL; a current phase calculator configured to subtract the phase of the inverter output current outputted from the current two-phase converter from the current phase reference value of the two-phase stationary reference frame, outputted from the current reference frame converter, and output a current phase control value; a current amplitude calculator configured to subtract the amplitude of the inverter output current, outputted from the current two-phase converter, from the current amplitude reference value of the two-phase stationary reference frame, outputted from the current reference frame converter, and output a current amplitude control value; a current controller configured to generate a current control signal using the calculated current phase and the calculated current amplitude; an output three-phase converter configured to convert the current control signal of the two-phase stationary reference frame, outputted from the current controller, frame into a current control signal of a three-phase stationary reference frame; and a PWM controller configured to output a PWM control signal to the inverter using the current control signal of the three-phase stationary reference frame, outputted from the output three-phase converter.

The filter may rectify and smooth an AC waveform outputted from the three-phase/two-phase converter.

The filter may pass a half cycle of one cycle of the signal outputted from the PLL.

The islanding detection apparatus further may comprise a non-detection zone (NDZ) setting unit configured to set an NDZ such that the phase of the inverter output current is not controlled when the frequency of the grid voltage, outputted from the PLL, is changed within a predetermined range.

The current phase reference value outputted from the phase controller may be added to a compensated reactive current value so as to compensate for a reactive current within the inverter while the current phase reference value is applied to the half cycle passer.

The current phase reference value for islanding detection, outputted from the half cycle passer, may be added to a reactive current setting value applied from outside, while the current phase reference value is applied to the current reference frame converter.

DETAILED DESCRIPTION

Figure 1:
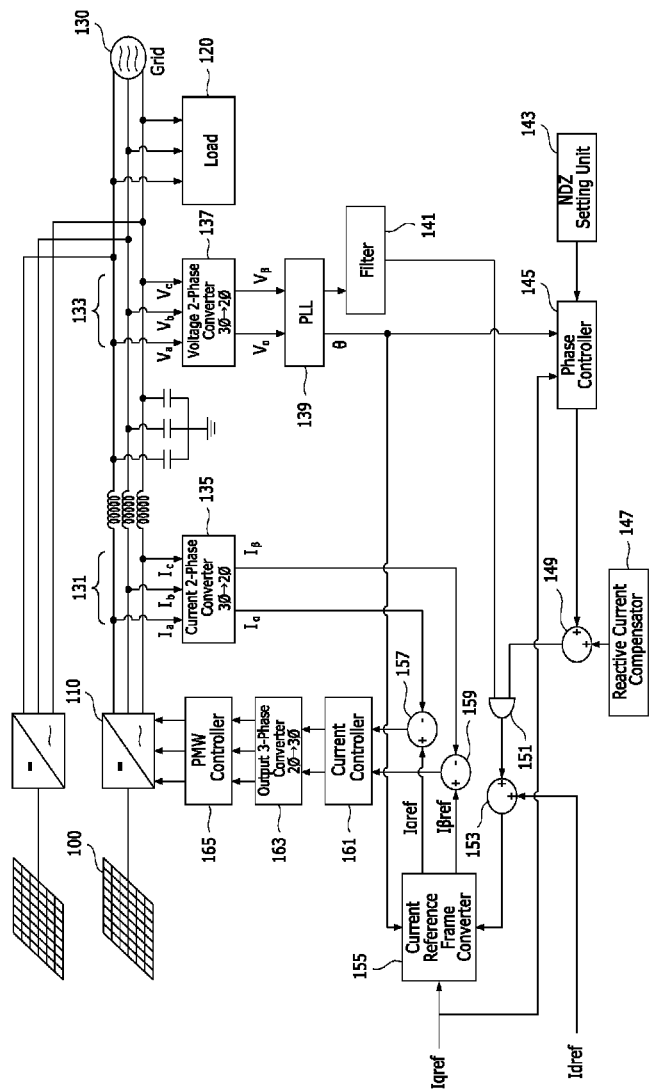
FIG. 1 is a block diagram of an islanding detection apparatus for parallel distributed generations according to an embodiment of the present invention.

Exemplary embodiments will be described below in more detail with reference to the accompanying drawings. The disclosure may, however, be embodied in different forms and should not be constructed as limited to the embodiments set forth herein. Rather, these embodiments are provided so that this disclosure will be thorough and complete, and will fully convey the scope of the disclosure to those skilled in the art. Throughout the disclosure, like reference numerals refer to like parts throughout the various figures and embodiments of the disclosure.

Figure 2:
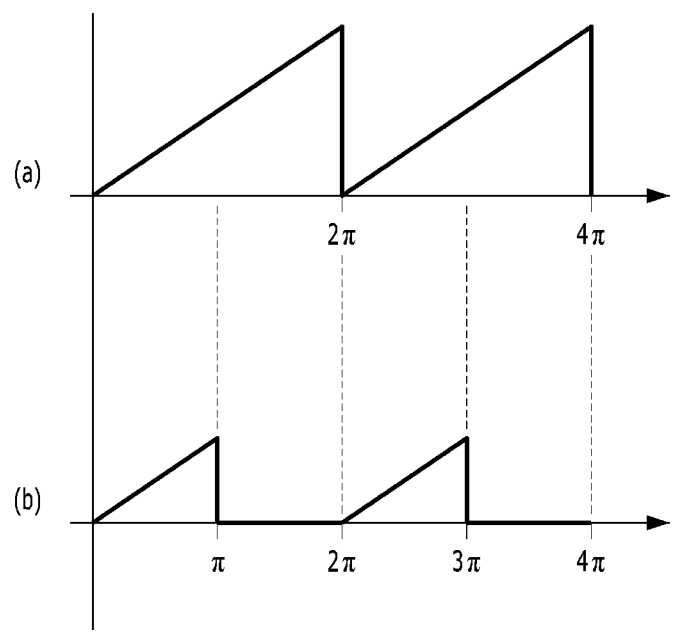
FIG. 2 is an input/output waveform diagram of a filter according to the embodiment of the present invention.

FIG. 1 is a block diagram of an islanding detection apparatus for parallel distributed generations according to an embodiment of the present invention. FIG. 2 is an input/output waveform diagram of a filter according to the embodiment of the present invention.

A solar energy generation system according to the embodiment of the present invention may include a solar module 100, an inverter 110, a load 120, a grid 130, a current transformer 131, a potential transformer 133, a three-phase/two-phase converter (current two-phase converter 135 and voltage two-phase converter 137), a phase locked loop (PLL) 139, a filter 141, a non-detection zone (NDZ) setting unit 143, a phase controller 145, a reactive current compensator 147, a phase reference value calculator 149, a half cycle passer 151, a reactive current adder 153, a current reference frame converter 155, a current amplitude calculator 157, a current phase calculator 159, a current controller 161, an output three-phase converter 163, and a PWM controller 165.

The solar module 100 may include solar cells connected in vertical and horizontal directions, and generate electric energy through a photoelectric effect based on incidence of sunlight.

The inverter 110 may convert DC power supplied from the solar module 100 into AC power. According to the embodiment of the present invention, a three-phase inverter may be used to convert a DC voltage into three-phase AC voltages.

The current transformer 131 may measure the output current of the inverter 110, and the potential transformer 133 may measure a grid voltage of the grid 130.

The three-phase/two-phase converter may include the current two-phase converter 135 and the voltage two-phase converter 137. The current two-phase converter 135 may convert a three-phase output current of the inverter into a two-phase stationary reference frame and the voltage two-phase converter 137 may convert a three-phase output voltage of the inverter into a two-phase stationary reference frame.

The current two-phase converter 135 may output three-phase current signals Ia, Ib, and Ic received from the current transformer 131 as two-phase stationary current signals Iα and Iβ of the two-phase stationary reference frame αβ.

The voltage two-phase converter 137 may output three-phase current signals Ia, Ib, and Ic received from the potential transformer 133 as two-phase stationary voltage signals Vα and Vβ of the two-phase stationary reference frame αβ.

The PLL 139 may receive the two-phase stationary voltage signals Vα and Vβ of the voltage two-phase converter 137, and calculate the phase and frequency of the grid voltage.

The filter 141 may pass ramp signals of 0 to 180 degrees among ramp signals of 0 to 360 degrees, outputted from the PLL 139, and not pass ramp signals of 180 to 360 degrees (refer to FIG. 2). Since the configuration in which the filter 141 passes only the ramp signals of 0 to 180 degrees among the ramp signals of 0 to 360 degrees is obvious to those skilled in the art, the detailed descriptions thereof are omitted herein.

The NDZ setting unit 143 may set an NDZ such that the phase of the inverter output current is not controlled, when the frequency of the output voltage of the inverter 110, outputted from the PLL 139, is minutely varied within a predetermined zone, and output a NDZ setting value. The NDZ may be arbitrarily set.

The phase controller 145 may generate a reference value for controlling the phase of the output current of the inverter 110, using the NDZ setting value and a current amplitude reference value Iqref applied from outside, when the frequency outputted from the PLL 139 exceeds the NDZ. In this case, Equation 1 may be applied.

$$\theta_F = \begin{cases} -\theta_M & \text{if } f_{Load[K-1]} < 59.3 \text{ Hz} \\ \theta_M \sin\left[\frac{\pi}{2} \frac{(f_{Load[K-1]} - f_{grid})}{f_M - f_{grid}}\right] & \text{if } 59.3 \text{ Hz} < f_{Load[K-1]} < 60.7 \text{ Hz} \\ \theta_M & \text{if } f_{Load[K-1]} > 60.7 \text{ Hz} \end{cases}$$

[Equation 1]

Here, $\theta_F$ represents the control phase angle of the output current, $\theta_M$ represents the maximum control phase angle of the output current, $f_{[K-1]}$ represents a frequency measured at a previous cycle, $f_M$ represents a measured frequency, an $f_{grid}$ represents the rated frequency of the system (for example, 60 Hz).

When the frequency $f_{[K-1]}$ measured at the previous cycle is equal to or less than 59.3 Hz or equal to or more than 60.7 Hz, the maximum control phase angle of the output current may be fixed to $\pm\theta_M$, in order to fix the maximum reactive power Q/P flowing to the grid. For example, when the reactive power Q/P is set to 6%, the maximum control phase angle $\theta_M$ may be set to 3.4336°.

On the other hand, when the frequency $f_{[K-1]}$ measured at the previous cycle is more than 59.3 Hz or less than 60.7 Hz, the phase controller 260 may change the control phase of the output current into sine waves.

The reactive current compensator 147 may compensate for a reactive current of a capacitance component within the inverter 110. This is in order to compensate for a reduction in load power factor due to a capacitance component of an LC filter provided in the inverter 110. The compensated reactive current may be arbitrarily determined.

The phase reference value calculator 149 may add the reference value outputted from the phase controller 145 and the compensated reactive current outputted from the reactive current compensator 147, and output a d-axis current compensated reference value, that is, a current phase compensated reference value Idref_comp.

The half cycle passer 151 may perform an AND operation on the output signal of the filter 141 and the d-axis current compensated reference value, pass only a part corresponding to 0 to 180 degrees in the d-axis current compensated reference value, and output an islanding detection d-axis current compensated reference Idref (AI). That is, the half-cycle passer 151 may pass the d-axis current compensated reference value only at a period corresponding to the upper half cycle of the two-phase voltage.

The reactive current adder 153 may output a control d-axis current setting value Idref_cont by adding the d-axis current setting value Idref applied from outside and the islanding detection d-axis current compensated reference value Idref (AI) outputted from the half cycle passer 151. The d-axis current setting value Idref may be arbitrarily set by a user, according to the surrounding environment. For example, when the commercial frequency is high because a nuclear power plant is positioned around, reactive power needs to be controlled to a low value. At this time, the d-axis current setting value Idref may be adjusted to lower the commercial frequency.

The current reference frame converter 155 may convert the current amplitude reference value Iqref of the synchronous reference frame, outputted from outside, and the control d-axis current setting value Idref_cont of the synchronous reference frame, outputted from the reactive current adder 153, into a current amplitude reference value Iαref and a current phase reference value Iβref, using the phase angle θ outputted from the PLL 139.

The current amplitude calculator 157 may subtract the amplitude Iα of the inverter output current outputted from the current two-phase converter 135 from the current amplitude reference value Iαref outputted from the current reference frame converter 155, and output a current amplitude control value (Iαref−Iα).

The current phase calculator 159 may subtract the phase Iβ of the inverter output current outputted from the current two-phase converter 135 from the current phase reference value Iβref outputted from the current reference frame converter 155, and output a current phase control value (Iβref−Iβ).

The current controller 161 may receive the current amplitude control value (Iαref−Iα) outputted from the current amplitude calculator 157 and the current phase control value (Iβref−Iβ) outputted from the current phase calculator 159, and generate a current control signal. Since the current control signal is an AC component of the stationary reference frame, the current controller 161 may generate the current control signal using a proportional resonant (P+Resonant) controller.

The output three-phase converter 163 may convert the two-phase current control signal of the stationary reference frame, generated from the current controller 161, into a three-phase current control signal of the stationary frame.

The PWM controller 165 may output a PWM control signal for controlling the inverter output current using the three-phase current control signal outputted from the output three-phase converter 163, and the PWM control signal may be provided to the inverter 110 to control the output current of the inverter.

In the present embodiment, as the reactive current (reactive power) is injected only at the upper half cycle of the grid voltage waveform, the power quality distortion can be reduced to the half in comparison to the technology which injects a reactive current at both of the upper and lower half cycles, and the plurality of distributed generations which are operated in parallel can be easily synchronized.

Figure 3:
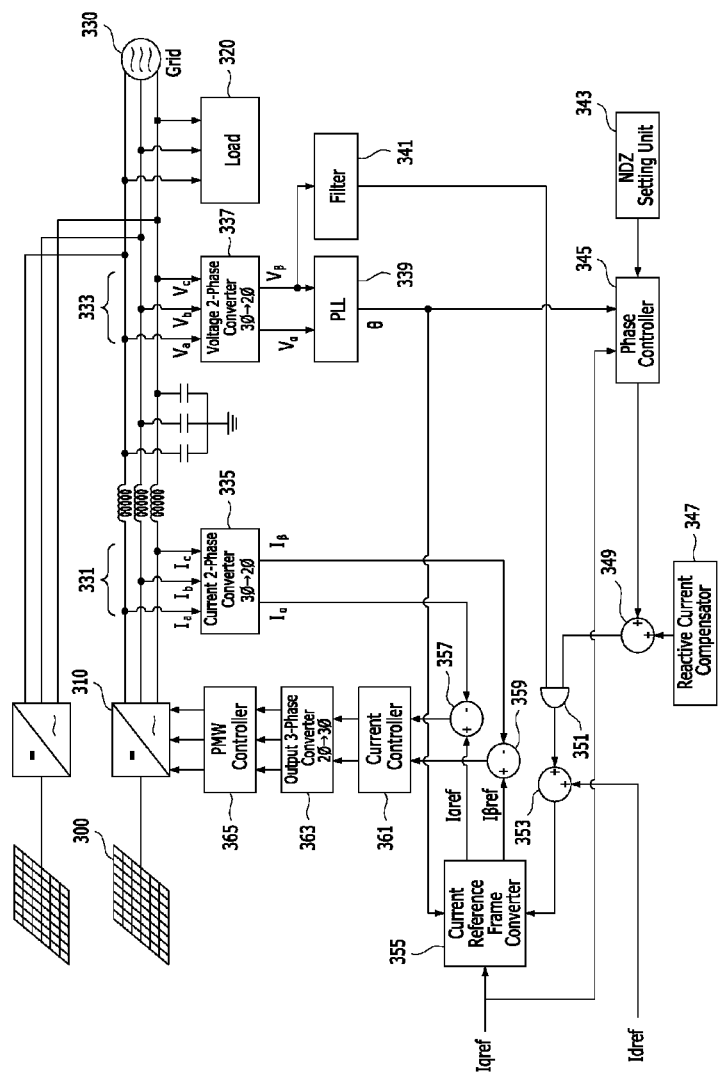
FIG. 3 is a block diagram of an islanding detection apparatus for parallel distributed generations according to another embodiment of the present invention.
Figure 4:
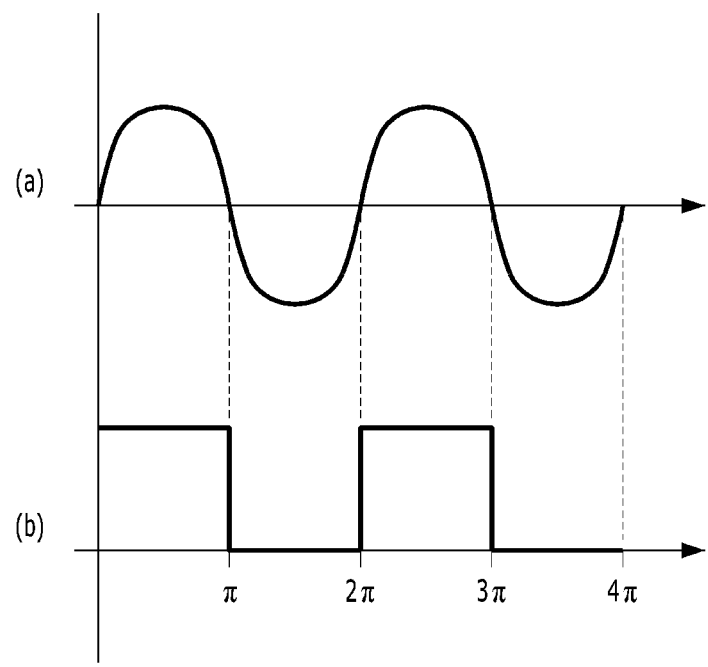
FIG. 4 is an input/output waveform diagram of a filter according to the embodiment of the present invention.

FIG. 3 is a block diagram of an islanding detection apparatus for parallel distributed generations according to another embodiment of the present invention. FIG. 4 is an input/output waveform diagram of a filter according to the embodiment of the present invention.

FIG. 3 illustrates an islanding detection apparatus for parallel distributed generations according to another embodiment of the present invention, and the islanding detection apparatus has almost the same configuration as the islanding detection apparatus of FIG. 1.

The islanding detection apparatus of FIG. 3 is different from the islanding detection apparatus of FIG. 1 in that an output of the voltage two-phase converter 337 is inputted to the filter 341, instead of the configuration in which an output of the PLL 339 is inputted to the filter 341.

That is, as illustrated in FIG. 4A, the output of the voltage two-phase converter 337 is a two-phase converted AC waveform of the grid voltage. The filter 341 may rectify and smooth the AC waveform, and output a rectified waveform as illustrated in FIG. 4B. The half cycle passer 351 may perform an AND operation on the d-axis current compensated reference value and the output of the filter 341, and output the d-axis current compensated reference value during the upper half cycle of the grid voltage. The filter 341 can be implemented in software or hardware manner. Since the configuration is obvious to those skilled in the art, the detailed descriptions thereof are omitted here.

According to the embodiments of the present invention, the islanding detection apparatus can detect islanding when distributed generations are operated in parallel, thereby minimizing a reduction in power quality. Furthermore, the islanding detection apparatus can synchronize the parallel distributed generations by periodically applying a reactive current at a half cycle.

Furthermore, when the injection directions of reactive powers injected to the respective distributed generations at the same timing are different in case where the distributed generations are operated in parallel, the sum of reactive powers outputted from the respective distributed generations may be offset at the connection points of the distributed generations. In this case, it is difficult to detect islanding. The islanding detection apparatus according to the embodiment of the present invention can solve such a problem.

Furthermore, even when the inverters installed in the plurality of distributed generations are fabricated by different inverters, the islanding detection apparatus can easily synchronize the parallel distributed generations, thereby easily detecting islanding in case where the distributed generates are operated in parallel.

While various embodiments have been described above, it will be understood to those skilled in the art that the embodiments described are by way of example only. Accordingly, the disclosure described herein should not be limited based on the described embodiments.

What is claimed is:

1. An islanding detection apparatus for parallel distributed generations, comprising:
   an inverter configured to convert a DC voltage supplied from a renewable energy source into an AC voltage;
   a three-phase/two-phase converter configured to convert an output of the inverter into a three-phase/two-phase stationary reference frame;
   a phase locked loop (PLL) configured to calculate the phase and frequency of a grid voltage of a grid connected to the inverter using a two-phase voltage outputted from the three-phase/two-phase converter;
   a filter configured to pass a half cycle of one cycle of a signal outputted from the three-phase/two-phase converter or the PLL;
   a phase controller configured to generate a current phase reference value for controlling an output phase of the inverter, using the frequency of the output voltage of the PLL and a current amplitude reference value applied from outside;
   a half cycle passer configured to perform an AND operation on the current phase reference value outputted from the phase controller and an output of the filter and output a current phase reference value for islanding detection;
   a current reference frame converter configured to convert the current amplitude reference value of a synchronous reference frame and the current phase reference value of the synchronous reference frame, outputted from the half cycle passer, into a current amplitude reference value and a current phase reference value of a two-phase stationary reference frame, using a phase angle outputted from the PLL;
   a current phase calculator configured to subtract the phase of the inverter output current outputted from the current two-phase converter from the current phase reference value of the two-phase stationary reference frame, outputted from the current reference frame converter, and output a current phase control value;
   a current amplitude calculator configured to subtract the amplitude of the inverter output current, outputted from the current two-phase converter, from the current amplitude reference value of the two-phase stationary reference frame, outputted from the current reference frame converter, and output a current amplitude control value;
   a current controller configured to generate a current control signal using the calculated current phase and the calculated current amplitude;
   an output three-phase converter configured to convert the current control signal of the two-phase stationary reference frame, outputted from the current controller, frame into a current control signal of a three-phase stationary reference frame; and
   a PWM controller configured to output a PWM control signal to the inverter using the current control signal of the three-phase stationary reference frame, outputted from the output three-phase converter.

2. The islanding detection apparatus of claim 1, wherein the filter rectifies and smoothes an AC waveform outputted from the three-phase/two-phase converter.

3. The islanding detection apparatus of claim 1, wherein the filter passes a half cycle of one cycle of the signal outputted from the PLL.

4. The islanding detection apparatus of claim 2, further comprising a non-detection zone (NDZ) setting unit configured to set an NDZ such that the phase of the inverter output current is not controlled when the frequency of the grid voltage, outputted from the PLL, is changed within a predetermined range.

5. The islanding detection apparatus of claim 4, wherein the current phase reference value outputted from the phase controller is added to a compensated reactive current value so as to compensate for a reactive current within the inverter while the current phase reference value is applied to the half cycle passer.

6. The islanding detection apparatus of claim 5, wherein the current phase reference value for islanding detection, outputted from the half cycle passer, is added to a reactive current setting value applied from outside, while the current phase reference value is applied to the current reference frame converter.

7. The islanding detection apparatus of claim 3, further comprising a non-detection zone (NDZ) setting unit configured to set an NDZ such that the phase of the inverter output current is not controlled when the frequency of the grid voltage, outputted from the PLL, is changed within a predetermined range.

* * * * *